Nov. 12, 1968 SHOEI KATAOKA ET AL 3,411,084

MICROWAVE DEVICES UTILIZING MAGNETORESISTANCE EFFECT

Filed June 13, 1963 6 Sheets-Sheet 1

United States Patent Office 3,411,084

Patented Nov. 12, 1968

3,411,084
MICROWAVE DEVICES UTILIZING MAGNETORESISTANCE EFFECT

Shoei Kataoka, Kitatama-gun, Tokyo-to, and Hiroyuki Fujisada, Shinagawa-ku, Tokyo-to, Japan, assignors to Agency of Industrial Science and Technology Ministry of International Trade and Industry, Tokyo-to, Japan, an authority of the Japanese government Filed June 13, 1963, Ser. No. 287,678
Claims priority, application Japan, June 15, 1962, 37/24,339; Sept. 14, 1962, 37/39,517; Sept. 17, 1962, 37/39,956; Oct. 3, 1962, 37/42,778
6 Claims. (Cl. 324—95)

This invention relates to an apparatus for measuring microwave energy by utilizing the magnetoresistance effect of a semi-conductor element and more particularly to a microwave wattmeter and a mixer utilizing such effect.

Heretofore, the electrical energy of microwaves has been measured by absorbing the microwave energy by means of a minute element (thermistor, barretter and the like) to convert the energy into heat and detecting the variation in the electric resistance of the minute element caused by an increase in its temperature by an electric bridge. With such a method, however, the load must be replaced by such absorbing element, and the instantaneous value of the energy of the pulse or rapidly changing power cannot be measured, but only their mean value with respect to time and this is objectionable. This method of measuring microwave energy by absorbing the energy by minute elements is usually limited to the measurement of microwave energies up to 10 mw. so that for measuring large energies, the calorie meter method has been proposed and in which the energy is absorbed by water and the temperature rise of the water observed. This latter method is also disadvantageous in that its accuracy of measurement is low and moreover the instantaneous energy cannot be measured.

For overcoming these defects, a number of improved microwave energy measuring systems have recently been investigated. One approach involves a torque type wattmeter utilizing an electrostatic force acting upon a metallic vane suspended in a waveguide. This particular wattmeter determines the microwave energy from the dimensions of various components and the measured value of the torque. The unit comprises a vane and mirror supported by a very thin quartz fiber as in a galvanometer so that it is delicate and has a tendency to be damaged by vibrations and shocks. Moreover, its method of reading is rather complicated in that the angle of revolution of the vane is read by utilizing the reflection of a light beam from the mirror. Thus, the torque type wattmeter has little practical value.

In order to solve the problems involved in the prior methods of measuring microwave energy, research has been made to develop an improved energy measuring system which utilizes the Hall effect of a semiconductor caused by the interaction between the electric field and the magnetic field of a microwave in a waveguide. According to this measuring system, the product of the electric field and the magnetic field of a microwave is determined by utilizing the Hall effect, thus measuring the true energy of the microwave transmitted. While this measuring system is excellent in principle, it is extremely difficult to construct a minute Hall element to be mounted in a waveguide and be completely balanced electrically between four terminals. Moreover, the four leads of the element act as obstacles for the transmission of the microwave so that when a standing wave is present in the waveguide, a thermoelectromotive force is induced across the terminals of the Hall element thus introducing an error. Generally, the contacts of the terminals of the Hall element are in the form of point contacts so that they have a rectifier characteristic which also introduces an error in the measurement.

It is therefore a principal object of this invention to provide a device which can simply and accurately measure the true value of the electromagnetic energy by electrically determining the effective product of the electric field and the magnetic field of a microwave travelling in a waveguide by utilizing the magnetoresistance effect of a two-terminal semiconductor instead of utilizing the Hall effect.

It is another object of this invention to provide a novel mixer for mixing two different frequencies by applying the same principle to two microwaves having different frequencies which is characterized by an excellent linear characteristic when compared with the conventional mixers for microwaves utilizing the nonlinear characteristic, such as for example of a crystal rectifier.

While the specification concludes with claims particularly pointing out and distinctly claiming the subject matter which we regard as our invention, it is believed that the invention will be better understood from the following description taken in connection with the accompanying drawings, in which the same or equivalent members are designated by the same reference numerals and latters.

Figure 3A:
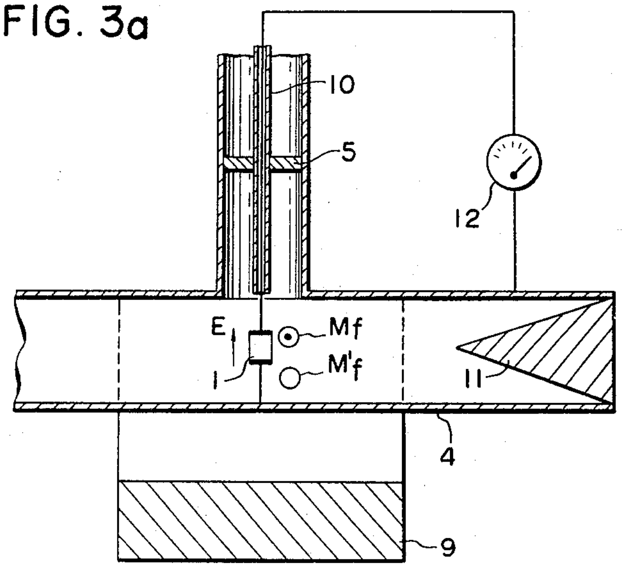
Figure 3B:
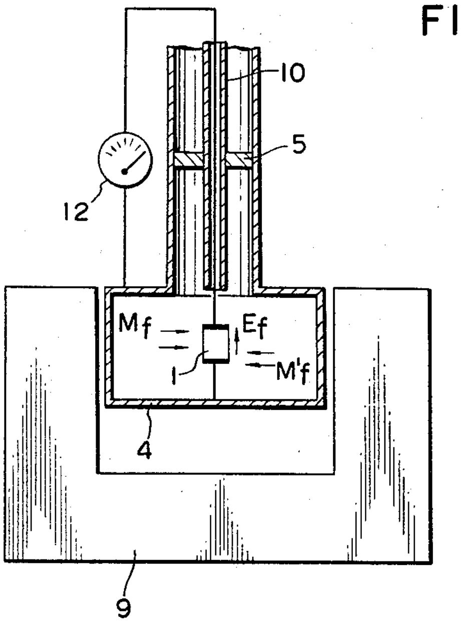
Figure 4:
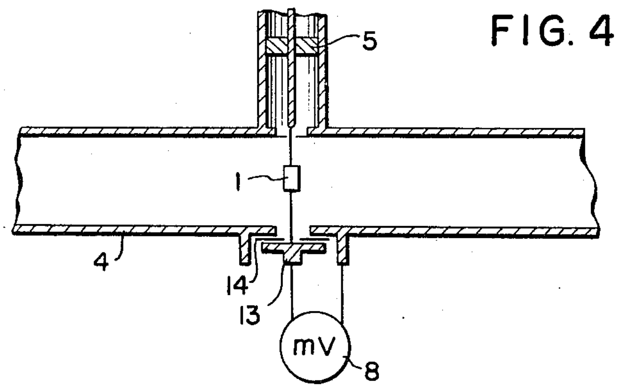
Figure 5:
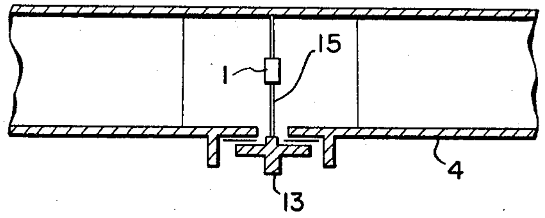
Figure 6:
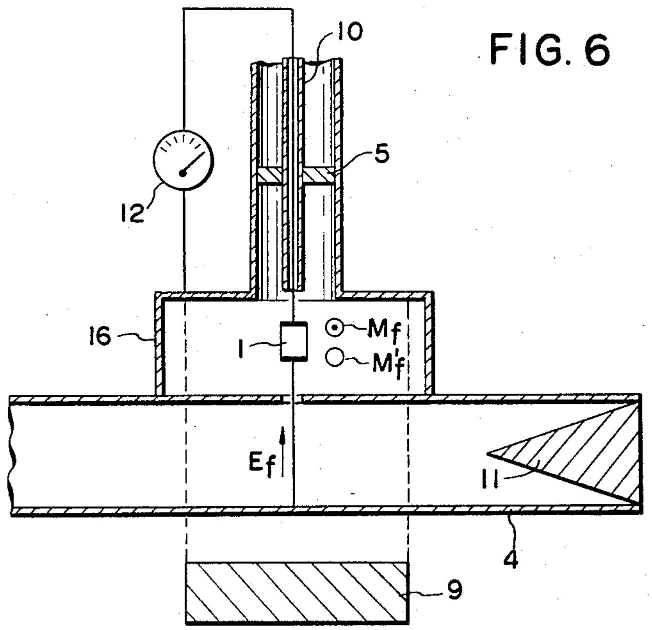

FIGS. 3*a* and 3*b* show a cross-section and longitudinal section, respectively, of the microwave wattmeter of this invention;

FIG. 4 shows a longitudinal section of a microwave wattmeter;

FIG. 5 shows a construction of a microwave wattmeter having improved frequency characteristic and constructed in accordance with this invention;

FIG. 6 shows a modified form wherein the semiconductor element is mounted in a cavity resonator coupled with a waveguide where the strength of the magnetic field is maximum.

Figure 7:
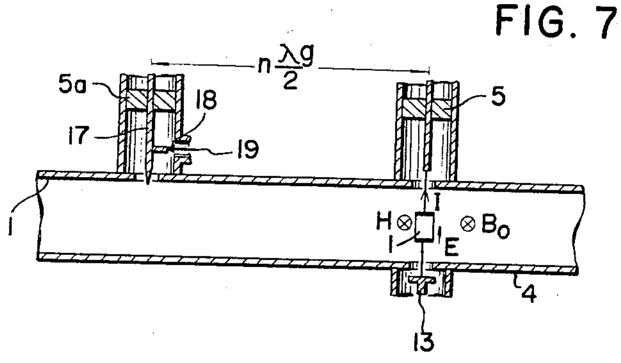
Figure 8:
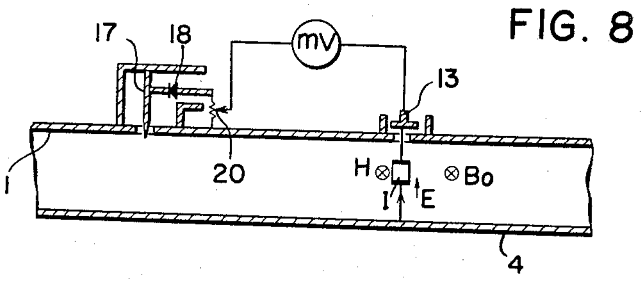
Figure 9:
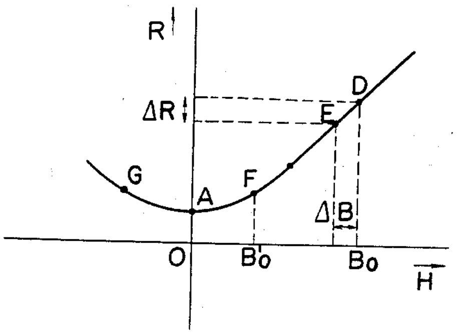
Figure 10:
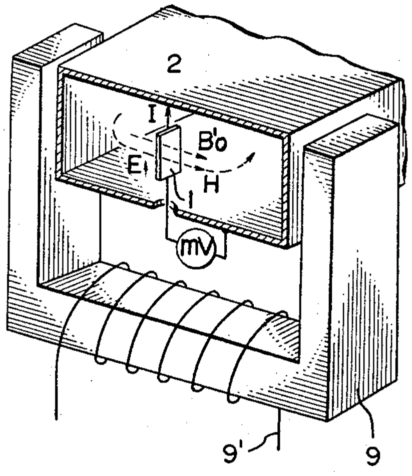
Figure 11:
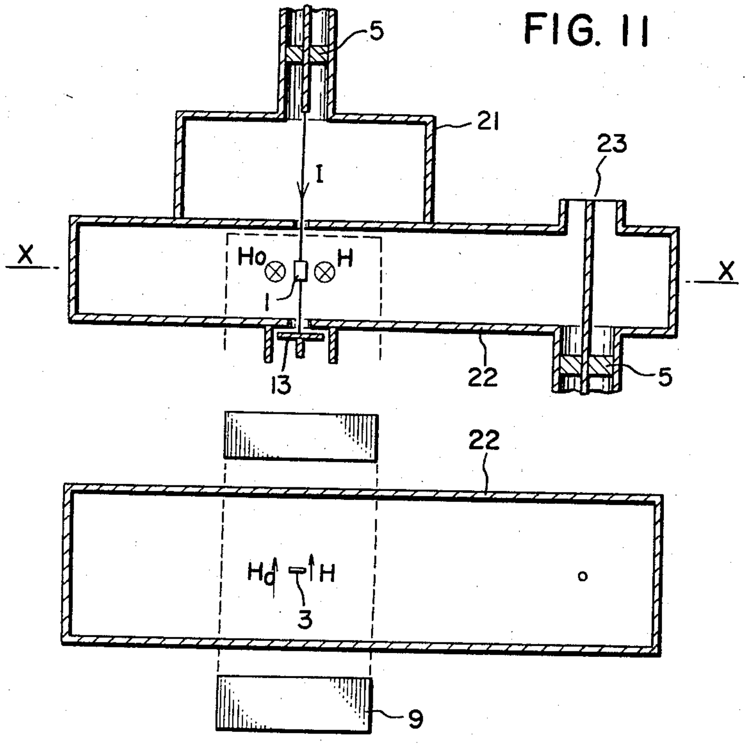
Figure 12:
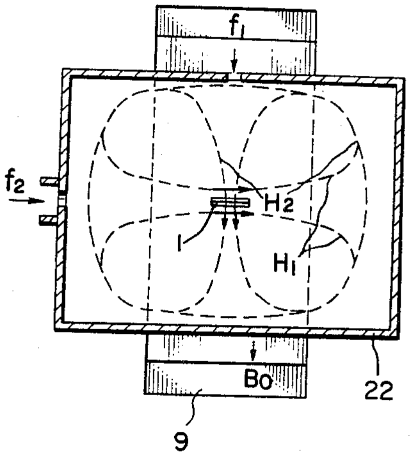

FIGS. 7 and 8 show modifications of this invention;

FIG. 9 shows a graph illustrating the magneto-resistance characteristic of a semiconductor body;

FIG. 10 shows a further modification of this invention;

FIG. 11 schematically shows a mixer according to this invention;

FIG. 12 shows an elevation of a modification of the mixer; and

Figure 13:
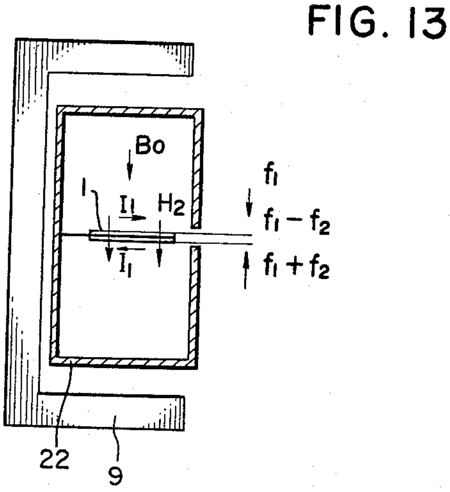

FIG. 13 is a side view of the mixer shown in FIG. 12.

Figure 1:
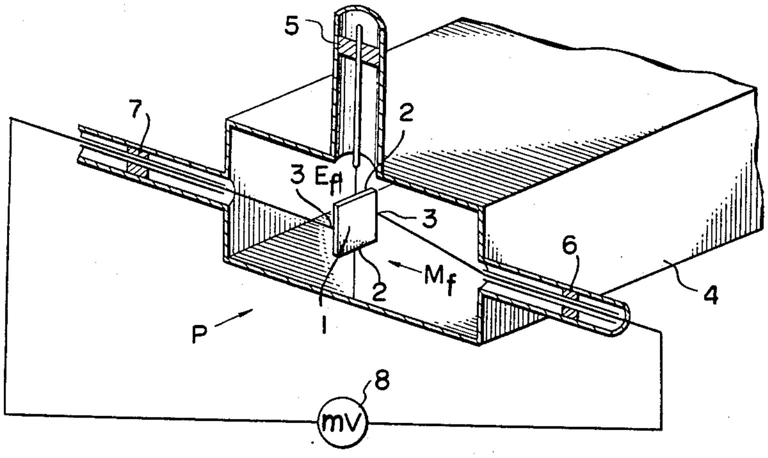
FIG. 1 PRIOR ART
FIG. 1 is a schematic view of a prior art microwave wattmeter utilizing the Hall effect.

In order to aid an understanding of this invention, a wattmeter of the prior art utilizing the Hall effect is shown in FIG. 1 wherein a semiconductor element 1 provided with a current electrode 2 and Hall terminals 3 is mounted in the central portion of a waveguide 4. One of of the current terminal leads of the element 1 is connected to the bottom of the waveguide while the other current terminal lead is connected to a central shaft extending through a coaxial piston 5 mounted in the upper portion of the device for inducing a current in the element which is proportional to electric field E*f* of the microwave by the action of the electric field in the waveguide. On the other hand, as magnetic field M*f* of the microwave extends in a direction perpendicular to the electric field in the waveguide 4, a Hall voltage proportional to the product of the electric and magnetic fields, or the energy or watt P will be induced across the terminals 3 by the action of the Hall effect. This induced voltage is supplied to a suitable voltmeter 8 located outside of the measuring device to determine the energy.

As mentioned above, such a wattmeter utilizing the Hall effect is objectionable for the following reasons:

(1) The Hall element requires four terminals provided with balanced impedances therebetween. However, it is extremely difficult to prepare small Hall elements which are adequate for mounting in waveguides.

(2) The terminal leads of the Hall element obstruct free transmission of the microwave.

(3) In order to adjust the microwave impedances between the terminals of the Hall element, it is necessary to provide adjusting means, such as piston- cylinder assemblies 6 and 7 which require a delicate adjustment.

(4) As the terminals of the Hall element resemble point contacts, they are liable to introduce errors caused by a rectifying action;

(5) There is a tendency to introduce errors due to the thermoelectromotive force appearing across the terminals of such element.

Figure 2:
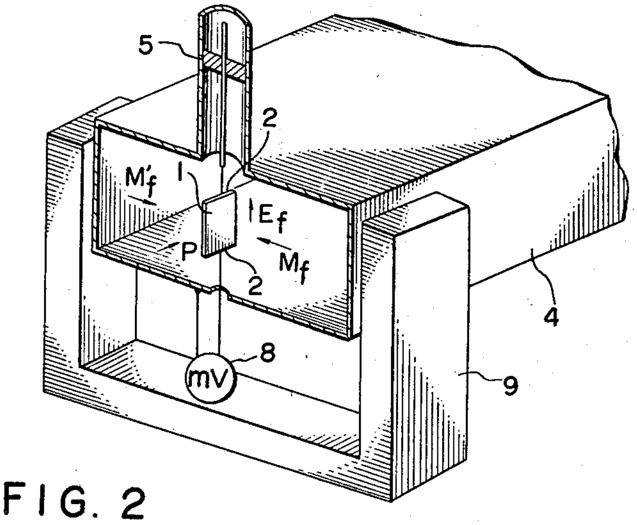
FIG. 2 is a schematic view of a microwave wattmeter utilizing the magnetoresistance effect embodying the principle of this invention.

In contrast, this invention contemplates the utilization of the magnetoresistance effect of a semiconductor body. The microwave device embodying the principle of this invention is advantageous in that it requires only two terminals, is of very simple construction and, completely eliminates all of the defects of the conventional wattmeter utilizing the Hall effect The construction and operation of the present microwave wattmeter will now be described in connection with FIG. 2. As in the measuring device shown in FIG. 1, a waveguide 4 supports a semiconductor element 1 having electrodes 2 in series with a central conductor adjustably supported by a coaxial piston 5 provided for an impedance adjustment for inducing, in the semiconductor element a current proportional to the electric field within the waveguide. It should be understood that in this case at least the terminal leads of the opposite electrodes should extend to the outside through a DC insulation. An external permanent magnet or electromagnet 9 is provided to apply a suitable DC magnetic bias to the semiconductor element. Hence, the electric resistance of the semiconductor element will vary in proportion to the strength of the magnetic field M*f* of the microwave in the waveguide. Accordingly, there will flow in the element, a current which is proportional to the electric field of the microwave to produce across opposite ends of the semiconductor element a voltage which is proportional to the product of the electric field and the magnetic field of the microwave. When the alternating current flowing through the semiconductor element and the alternating magnetic field acting upon such element have the same number of frequency, generally a DC voltage proportional to the product of the current and the magnetic field is produced across the opposite ends of the semiconductor element so that the transmitted energy P of the microwave can be determined by reading the induced voltage via a voltmeter 8 situated outside the measuring device. The purpose of applying the bias magnetic field from the outside is to cause a semiconductor resistance to vary linearly in proportion to the microwave magnetic field.

FIGS. 3*a* and 3*b* disclose an example of a direct flow type wattmeter including a tube 10 extending through a piston 5 adapted to adjust the phase of the current in a semiconductor element 1. One lead is passed through the tube 10 and connected to one of the electrodes of the semiconductor element, and the other lead is connected between the other electrode and the bottom portion of a waveguide 4. A voltmeter 12 is connected between the outer end of the first mentioned lead and the outer wall of the waveguide 4 to indicate the DC voltage appearing across the opposite ends of the semiconductor element.

FIG. 4 shows a modified apparatus in which a coaxial piston is needed as the phase adjusting piston 5, and the central conductor thereof is connected to one electrode of the semiconductor element 1. The lead wire connected to the other electrode extends through a small perforation provided in the bottom wall of the waveguide 4 and is connected to a metallic terminal plate 13 via a thin mica plate 14 which insulates direct currents, but short-circuits microwaves. The outer terminal of this lead is connected directly to the waveguide where BNC connectors are connected to derive the DC voltage across the semiconductor element.

FIG. 5 shows a further modification in which for improving the frequency characteristic of the wattmeter, the piston 5 is replaced by resistance wires 15 of relatively high resistance or thin strips, consisting of silver paste on mica, and which are connected in series with the semiconductor element 1.

In a further embodiment shown in FIG. 6, a semiconductor element 1 is mounted in a position in which the magnetic field is at a maximum in a cavity resonator 16 coupled with the main waveguide 4. The remaining components of the device are arranged as disclosed in FIGS. 2 to 4, inclusive. By this arrangement, the magnetic field component of the microwave can be strengthened to improve the sensitivity thereof.

In the microwave wattmeter utilizing the magnetoresistance effect of the semiconductor elements, any rectifying property between the semiconductor element and the electrode, if present, may introduce a residual rectified voltage into the output voltage created by the magnetoresistance effect thus introducing an error in the measurement. This error can be eliminated by providing a separate rectified voltage which is equal to the error voltage and then adding the separate rectified voltage with an opposite polarity.

FIG. 7 illustrates one example of such modification wherein a probe 17 is located at a point spaced from the semiconductor element 1 mounted in a waveguide 4 by a distance equal to an integral multiple of ½ wave length ($n\lambda g/2$). The probe 17 may be of the type used in a standing wave measuring device adapted to provide to the output terminal 19 through a rectifier (crystal) 18 a rectified voltage which is proportional to the electric field of the microwave. The position of piston **5*a* and the length of the probe 17 are so selected that the rectified voltage supplied by the rectifier 18** is equal to the residual rectified voltage generated by the semiconductor element acting as the microwave wattmeter.

While in this modification the distance between the probe 17 and the semiconductor element 1 is selected to be equal to $n\lambda g/2$, it should be understood that the reason for this is to accurately operate the wattmeter irrespective of the power factor of the load (standing wave ratio). When the power factor of the load (standing wave ratio) is substantially at unity, the probe may be inserted in any position of the waveguide.

Thus, by connecting a voltmeter across output terminal 13 of the wattmeter and the output terminal 19 of the rectifier, a correct indication proportional to the energy travelling through the waveguide can be effected on a voltmeter regardless of the rectifying property of the semiconductor element.

FIG. 8 shows a modification of the arrangement in FIG. 7 wherein the adjusting piston for driving the probe 17 and the wattmeter are omitted to simplify the construction and operation. A portion of the rectified voltage from the probe 17 is derived through a potentiometer 20 to provide the necessary balance.

When an alternating magnetic bias of a fixed amplitude is employed in lieu of a fixed DC magnetic bias in the microwave energy measuring devices utilizing the magneto-resistance effect, the semiconductor element output proportional to the microwave energy and produced by the magnetoresistance effect will have the same frequency as the alternating magnetic bias (for example the frequency of the commercial alternating current) so that it can be easily amplified. Moreover, it is possible to eliminate the effect caused by the rectifying property of the semiconductor element without the necessity of providing the above described compensating arrangements.

As by a curve shown in FIG. 9, the electrical resistance R of a semiconductor element generally varies at first in proportion to the square of the magnetic field and then to the first power thereof as the magnetic field H varies. Thus, with a small signal magnetic field, it is not necessary to increase the bias magnetic field to $B_0$, but to increase it only to the magnitude in the square region of the characteristic curve. The reason for this is that for a small increment of the magnetic field, it can be considered that the electrical resistance of the semiconductor element varies linearly. In this case, the sensitivity of the multiplier on the wattmeter is proportional to the slope $\Delta R/\Delta H$ of the characteristic curve. Consequently when it is assumed that the bias magnetic field is changed in the reverse direction from a point F corresponding to $B_0'$ to a point G, the output will be proportional to the bias magnetic field per se because it is determined by the slope of the curve FAG. Accordingly, it will be clear that when the bias is a sine wave alternating current the output also would be a sine wave alternating current.

FIG. 10 illustrates an example which utilizes an electromagnet 9 having an alternating current exciting coil 21 instead of the biasing permanent magnet 9 used in the above described embodiments. By applying an alternating magnetic bias to the semiconductor element 1, the semiconductor element output proportional to the microwave energy will become an alternating current having the same frequency as the magnetic bias so that not only the output is free from the effect of the rectifying property remaining at the electrode portion of the semiconductor element, but also can be easily amplified.

The same principle employed in the above mentioned wattmeter can be applied to provide a mixer for microwaves by such an arrangement that a current having one of the microwave frequencies flows through a semiconductor element and a magnetic field having the other of the microwave frequencies is applied to the element.

Referring now to FIG. 11, a semiconductor element 1 is connected to the lower end of a conductor extending along the axis of a waveguide which carries the main microwave having a frequency, $f_1$, said conductor being supported by an adjustable coaxial piston mounted on the upper central part of the waveguide. The lower electrode of the semiconductor element 1 is connected to an output terminal 13 through the bottom wall of a cavity resonator 22 which is designed to tune with the local oscillation frequency $f_2$ and provide a zero electrical field and maximum magnetic field at the position where the semiconductor element is located. A permanent magnetic or an electromagnet 9 is provided on the opposite sides of the resonator 22 to apply a fixed bias magnetic field $H_0$ across the semiconductor element 1. The numeral 5 represents a piston for impedance matching.

With the construction shown in FIG. 11, the microwave travelling through main waveguide 21 will induce in the semiconductor element 1 a current I having the frequency $f_1$ while, at the same time, an input of the frequency $f_2$ from a local oscillator (not shown) will be introduced into the resonator 22 via an input terminal 23 of the cavity resonator 22 to apply a magnetic field of the frequency $f_2$ to the semiconductor element 1. Thus, the electrical resistance of the semiconductor element 1 will vary at the frequency $f_2$ so that due to the interaction between the current flowing through the semiconductor element 1 and the magnetic field applied thereto, there will appear across the output current terminals of the semiconductor element voltages proportional to $(f_1+f_2)$ and $(f_1-f_2)$ in addition to the voltage drop due to the current I of frequency $f_1$. Thus, by connecting a proper filter to the output terminal, it is possible to selectively derive either the output of $(f_1-f_2)$ or $(f_1+f_2)$ thereby providing a mixer.

In FIGS. 12 and 13 is shown a modification of the mixer wherein a thin semiconductor element 1 is mounted at the center of a cavity resonator 22 designed to resonate to produce the maximum magnetic field at the center from two inputs having frequencies $f_1$ and $f_2$, respectively. In this case, a current $I_1$ will be induced to flow through the semiconductor element 1 by the first input of frequency $f_1$ while a resonance magnetic field $H_2$ produced by the second input is applied thereto at right angles. Further, by applying a bias magnetic field $H_0$ from the outside by means of a magnet 9, voltage drops of the frequencies $f_1$, $(f_1+f_2)$ and $(f_1-f_2)$ respectively, will appear across the opposite ends of the semiconductor element 1. Thus, it is possible to use a filter to derive either the output of $(f_1-f_2)$ or $(f_1+f_2)$.

In accordance with the provision of the patent statutes, we have explained the principle and operation of our invention and illustrated and described what we consider to represent the best embodiments thereof. However, we desire to have it understood that within the scope of the appended claims the invention may be practised otherwise than as specifically illustrated and described.

What is claimed is:

1. An apparatus for measuring microwave energy by utilizing the magnetoresistance effect of a semiconductor element, comprising a waveguide, an adjustable coaxial piston mounted on the upper central part of said waveguide, a central conductor supported by said coaxial piston, a magnetoresistance element enclosed in the microwave magnetic field in said waveguide, said magnetoresistance element having two terminal lead wires, one of said lead wires being connected to said central conductor and the other of said lead wires extending exteriorly of said waveguide, means applying a bias magnetic field across said semiconductor element whereby variations in the microwave magnetic field in said waveguide produce corresponding variations in the resistance of said semiconductor element, and means for measuring across opposite ends of said semiconductor element the direct current voltages induced by said microwave magnetic field in said semiconductor element thereby measuring microwave energy in said waveguide.

2. The apparatus for measuring microwave energy as claimed in claim 1 in which an alternating magnetic field is applied to said semiconductor element as the bias magnetic field.

3. An apparatus for measuring microwave energy by utilizing the magnetoresistance effect of a semiconductor element, comprising a waveguide, an adjustable coaxial piston mounted on the upper central part of said waveguide, a central conductor supported by said coaxial piston, a magnetoresistance element enclosed in the microwave magnetic field in said waveguide, said magnetoresistance element having two terminal lead wires, said waveguide having a bottom wall provided with a small perforation, one of said lead wires being connected to said central conductor and the other of said lead wires extending through said perforation in the bottom wall of the waveguide, a metallic terminal plate facing the small perforation in said bottom wall and spaced therefrom, a mica plate inserted in the space between said terminal plate and bottom wall to provide a condenser, said mica plate having a small opening, said metallic terminal plate being connected to said other of said lead wires which extends through said small perforation, and a volt meter operably connected between said metallic terminal plate and said waveguide whereby a direct current voltage in proportion to the electric power passing through said waveguide is measured in said volt meter.

4. An apparatus for measuring microwave energy by utilizing the magnetoresistance effect of a semiconductor element, comprising a waveguide, an adjustable coaxial piston mounted on the upper central part of said waveguide, a central conductor supported by said coaxial piston, a magnetoresistance element enclosed in the microwave magnetic field in said waveguide, said magnetoresistance element having two terminal lead wires, said waveguide having a bottom wall provided with spaced apart small perforations, one of said lead wires being connected to said central conductor and the other of said lead wires extending through one of said small perforations, a metallic output terminal to which said other lead wire is connected, a probe mounted on said waveguide at a position spaced from said central conductor by a distance equal to an integral multiple of ½ length of the wave length of the input microwave, said probe having a tip extending into said waveguide through the other of said small perforations, a rectifier, one electrode of said rectifier being connected to said probe and the other electrode being connected to said output terminal, and means for applying a bias magnetic field to said semiconductor element from outside said waveguide.

5. A microwave mixer utilizing the magneto-resistance effect, comprising a waveguide carrying the main microwave having a frequency $f_1$, a cavity resonator disposed below said waveguide, a magnetoresistance semiconductor element disposed below said waveguide and inserted in said resonator, said magnetoresistance element having an upper and a lower terminal, an adjustable coaxial piston mounted on the upper central part of said waveguide, a central conductor supported by said coaxial piston and extending along the axis of said waveguide, the lower end of said central conductor being connected to the upper terminal of said semiconductor element, an output terminal, the lower terminal of said semiconductor element being connected to said output terminal through the bottom wall of said cavity resonator, a conductor supported in said cavity resonator and having an input terminal, an outside local oscillator having an output of a frequency $f_2$, means connecting the input terminal of the conductor in said resonator to said oscillator, and means for applying to said semiconductor element a bias magnetic field from outside of said resonator for providing an output corresponding to the sum $(f_1+f_2)$ or difference $(f_1-f_2)$ of said frequencies across the current terminals of said semiconductor element thereby effecting mixing of said microwaves.

6. The microwave mixer as claimed in claim 5 in which an alternating magnetic field is applied to said semiconductor element as the bias magnetic field.

References Cited

UNITED STATES PATENTS

| | | | |
|---|---|---|---|
| 2,659,043 | 11/1953 | Taylor. | |
| 2,946,005 | 7/1960 | Waterfield et al. | 324—95 |
| 2,571,915 | 10/1951 | McCoubrey | 332—51 XR |
| 2,906,945 | 9/1959 | Weiss | 324—45 |
| 2,939,091 | 5/1960 | Bock et al. | 332—51 |
| 3,238,451 | 3/1966 | Shively | 324—95 XR |

OTHER REFERENCES

Barlow, H. M.: The Hall Effect and Its Application To Microwave Power Measurements, in Proceedings of the IRE, July 1958, pp. 1411–1413.

RUDOLPH V. ROLINEC, *Primary Examiner.*

E. F. KARLSEN, *Assistant Examiner.*